May 14, 1940. V. A. ROLLINGS 2,200,681
MOTION-PICTURE PROJECTION
Filed March 1, 1939 4 Sheets-Sheet 4
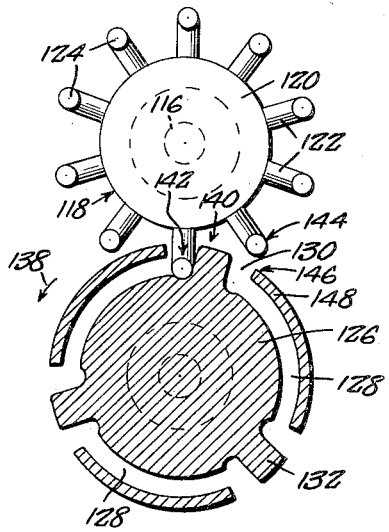
Fig. 6.
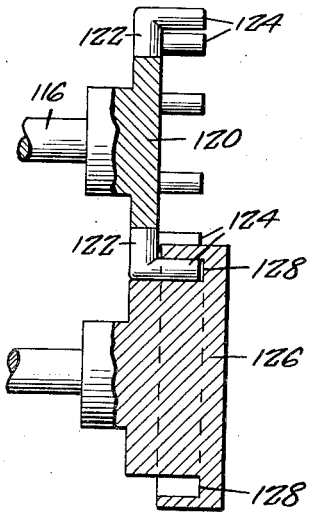
Fig. 7.
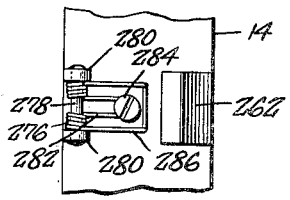
Fig. 8.
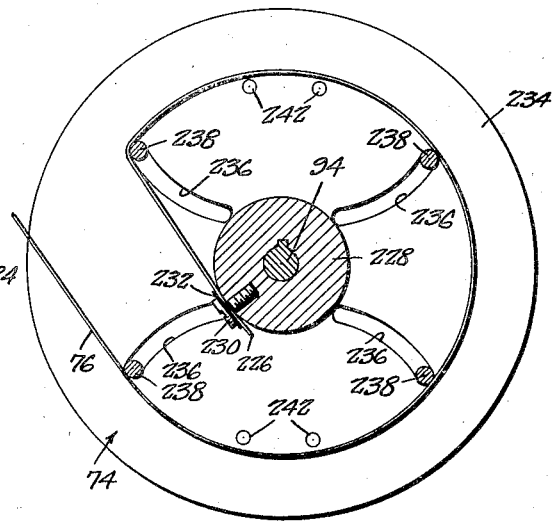
Fig. 9.
Fig. 10.
Fig. 11.
Fig. 12.
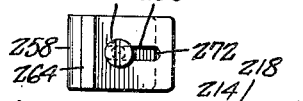
Vernon A. Rollings,
INVENTOR
BY Victor J. Evans & Co.
ATTORNEYS
WITNESS Patented May 14, 1940

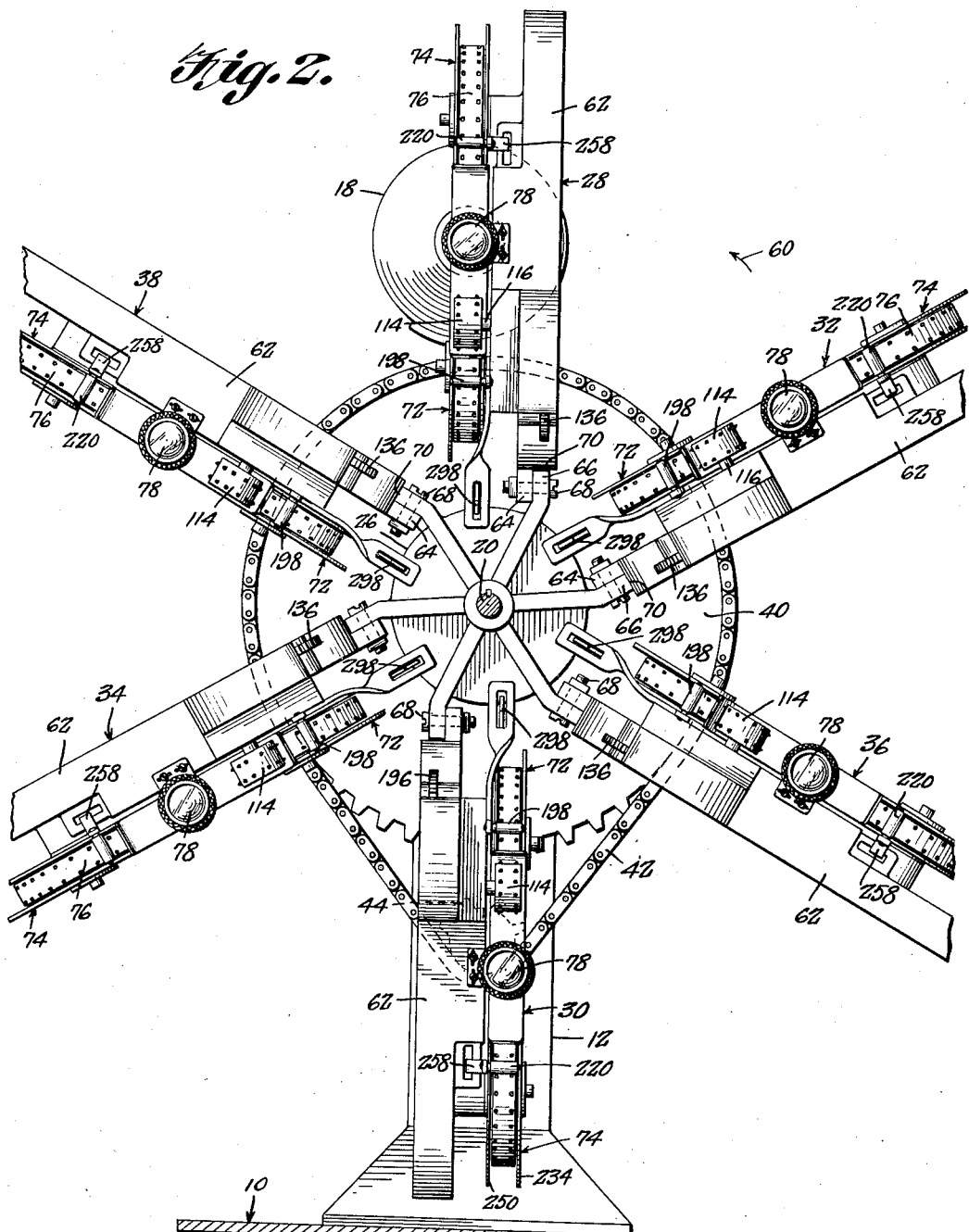

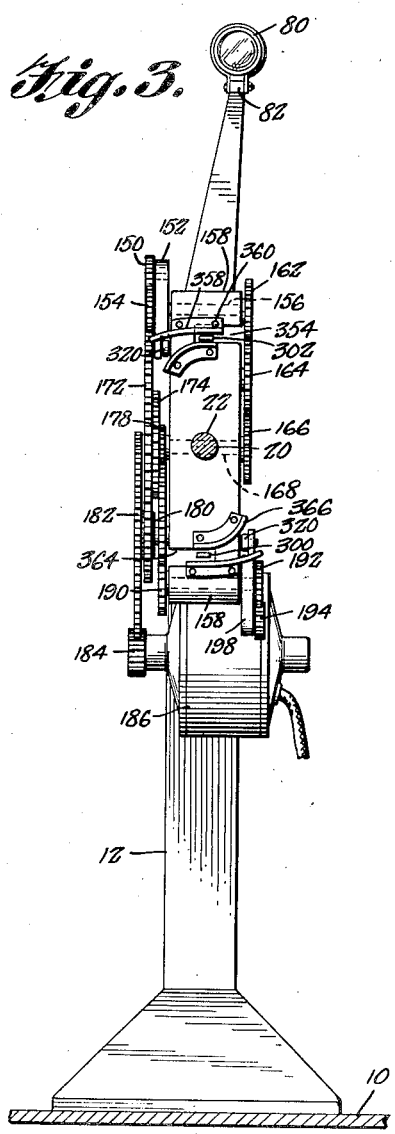

2,200,681

UNITED STATES PATENT OFFICE 2,200,681

MOTION-PICTURE PROJECTION

Vernon A. Rollings, Terre Haute, Ind.

Application March 1, 1939, Serial No. 259,244

11 Claims. (Cl. 88—17)

My invention relates to the art of projecting motion pictures, and includes among its objects and advantages the provision of an improved motion-picture projector.

An object of my invention is to provide a motion-picture projector wherein novel means are incorporated for bringing a series of films into successive projection positions through the instrumentality of a unit embodying means for automatically bringing the next film into projecting position as the preceding film is finished.

A further object is to provide a motion-picture projector embodying novel means for successively moving a series of films into projecting positions in which novel means are provided for unwinding projected films.

Another object is to provide a motion-picture projector embodying a plurality of upper and lower film magazines for handling a series of films in which the film magazines are arranged to be successively brought into projection positions and in which novel means are incorporated for unwinding projected films.

A further object is to provide a motion-picture projector embodying magazine units connected as a unit for successively bringing films into projecting positions in which novel means are employed for unwinding projected films for re-use in the unit. The unwinding means includes compensating means for maintaining the convoluted film on the wind-up reel of substantially uniform outside diameter.

In the accompanying drawings:

Figure 2 is a front elevational view with certain parts removed;

Figure 3 is a detail view;

Figure 4 is a detail view of a switch for controlling the circuit through the motor which shifts the film magazines to successive projection positions;

Figure 5 is a side elevational view of the switch structure of Figure 4;

Figure 6 is a sectional view of an intermittent-movement mechanism;

Figure 7 is a side elevational view of the structure of Figure 6;

Figure 8 is a view of the stop means for arresting further movement of the film magazines when brought into projecting positions;

Figure 9 is an end view of the structure of Figure 8 with a stop arm associated therewith;

Figure 10 is an end view of the stop arm;

Figure 11 is a sectional view of the film winding compensator; and

Figure 12 is a detail view of a stop element connected with a film.

Figure 1:
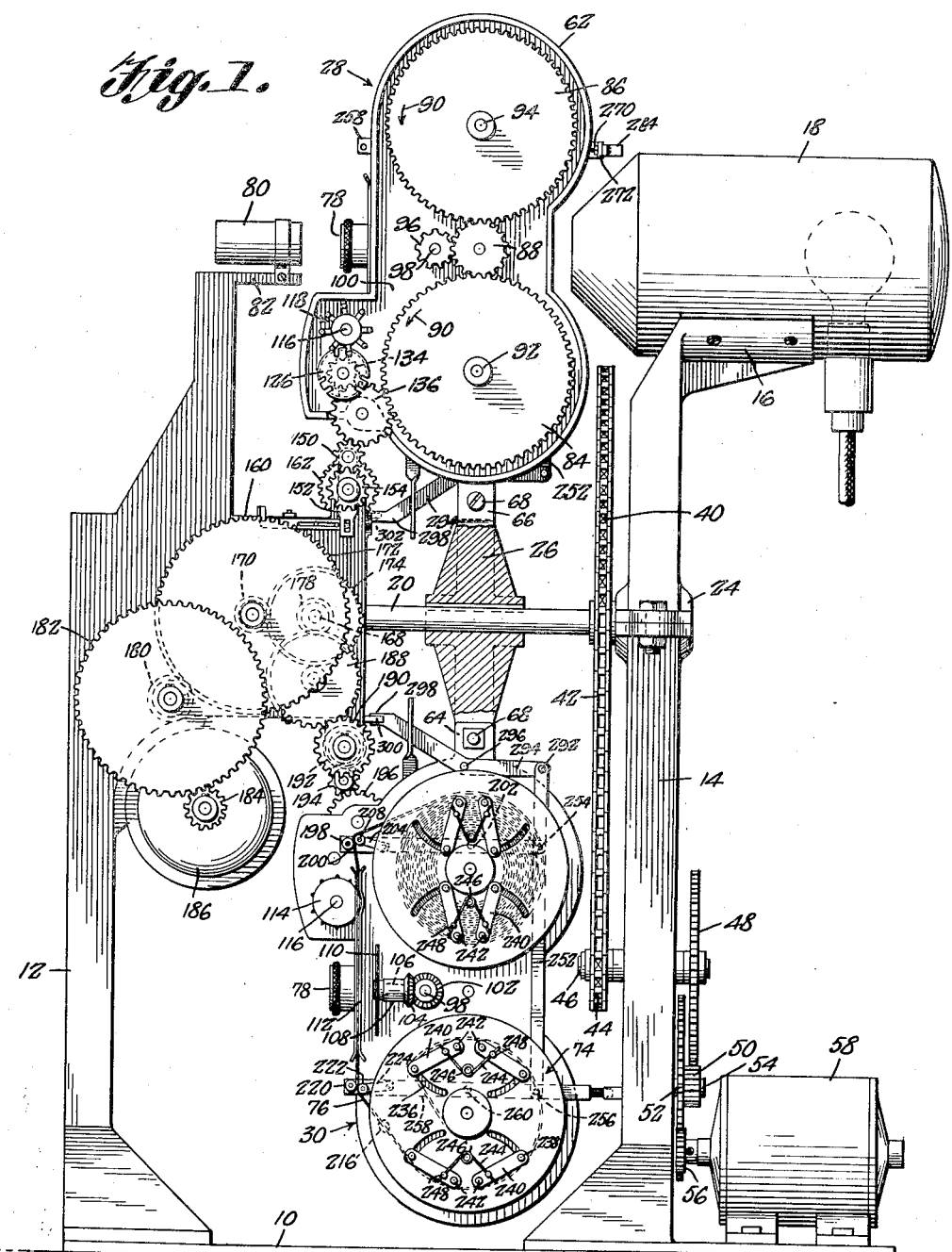
Figure 1 is a side elevational view of a motion-picture projector embodying my invention with certain parts removed for the sake of clearness.

In the embodiment selected to illustrate my invention, I make use of a base 10 which includes two upright brackets 12 and 14. Bracket 14 is provided with right-angular floor 16 for supporting the lamp house 18, which is of conventional construction. One end of a shaft 20 is rotatably journaled in a bore 22 in the bracket 12, see Figures 1 and 3. Bracket 14 is made sectional to provide a bearing 24 within which the opposite end of the shaft 20 is rotatably journaled. To the shaft 20 I fixedly key a hub 26 which supports a plurality of film magazine units 28, 30, 32, 34, 36 and 38. These units are spaced equally apart and project radially from the hub 26, in addition to lying in a common plane.

In Figures 1 and 2, I illustrate the shaft 20 as being provided with a large sprocket 40 connected with a chain 42 passing about a smaller sprocket 44. Sprocket 44 is keyed to a shaft 46 rotatably journaled in the bracket 14 and keyed to a large gear 48 arranged in mesh with a small gear 50. Gear 50 is fixedly related to a larger gear 52 rotatably journaled on a pivot 54 and is arranged in mesh with a pinion 56 driven by the motor 58. It will thus be seen that I provide speed reducing connection between the motor and the shaft 20.

The film magazine units 28 to 38 are identical in construction and operation so that the description of one will apply to all. Figure 1 illustrates the units 28 and 30 only. These two units are diametrically opposed with respect to the shaft 20. This is also true of the units 32 and 34 and 36 and 38. Figure 1 illustrates the unit 28 in the projecting position, while the unit 30 is illustrated in the film unwinding position. During the operation of the machine, the shaft 20 is rotated at predetermined intervals for rotating the shaft 20 and the units 28 to 38 as a unit in the direction of the arrow 60 of Figure 2. Such rotation is initiated at the moment that the projected film is finished for bringing the next film into projecting position.

In Figure 2, the gear housings 62 of the units 28 to 38 are flanged at 64 and arranged in overlapping relation with lugs 66 projecting beyond the periphery of the hub 26. The overlapping flanges and lugs are provided with aligned bores for the reception of bolts 68 for connecting the parts into a unitary structure. The ends 70 of the lugs are flat and have abutting relation with their associated housings 62 for restraining the housings from accidental pivotal movement about the bolts 68 as axes. Each housing 62 carries a lower reel 72 and an upper reel 74. The films 76 are pre-wound on the upper reels 74 for projection purposes, and are wound upon the lower reels during projection of the films. Each housing is also provided with a projection lens unit 78 arranged to be aligned with the lens unit 80 as the housing or the unit represented by the housing is brought into projecting position. Lens unit 80 is mounted on a support 82 carried by the upper end of the bracket 12. Lens units 78 and 80 are conventional and need not be described in detail.

Figure 1 illustrates the reels 72 and 74 of the unit 30, while the housing 62 of the unit 28 is illustrated as being provided with two gears 84 and 86 arranged in mesh with a connecting pinion 88 so that the two gears will be rotated in unison in the direction of the arrows 90 during projection of the associated film 76. Gear 84 is connected with a shaft 92 which in turn is connected with the reel 72 for rotating the latter. Similarly, gear 86 is keyed to a shaft 94 which is connected with the reel 74 for rotating the same.

Gear 88 in Figure 1 is illustrated as being in mesh with a pinion 96 keyed to a shaft 98 rotatably journaled in the wall 100 of the housing 62 and is provided with a bevel gear 102 at its opposite end and upon the opposite side of the wall. Bevel gear 102 is illustrated in connection with the unit 30 of Figure 1 since this unit is reversed with respect to the unit 28. Gear 102 is arranged in mesh with a gear 104 mounted on a shaft 106 rotatably journaled in the bearing 108 carried by the associated wall 100. Shaft 106 is provided with a three-blade shutter 110 arranged in operative relation with the lens unit 78 associated therewith. The gears and shutter so far described are identical in all the units 28 to 38 so that the description of one will suffice.

In association with the shutter 110 and the lens unit 78 of Figure 1, I illustrate the usual film guide and gate 112. Unit 30 in Figure 1 is illustrated as being provided with an intermittently operated sprocket 114 cooperating with the film guide for moving the film in the usual manner. Sprocket 114 is mounted on a shaft 116 which extends through the wall 100 and is connected with an intermittent-movement 118 at its under end, which movement is illustrated in connection with the unit 28. Figures 6 and 7 illustrate the intermittent-movement 118 as comprising a circular plate 120 provided with radial shafts 122 provided with right-angular fingers 124. Intermittent-movement 118 is driven through the medium of a three-peg drum 126. The drum 126 is provided with segmental grooves 128 in one face thereof and intersecting slots 130 spaced to provide teeth 132. Figure 6 illustrates three equally spaced teeth 132.

Drum 126 is keyed to a pinion 134 arranged in mesh with a gear 136 meshing with the gear 84. Rotation of the drum 126 in the direction of the arrow 138 causes the tooth 132 in the 140 position to engage the finger 124 in the 142 position to rotate the intermittent-movement 118 for bringing the finger 124 in the 144 position into the slot 130 in the 146 position. The finger will move underneath the flange 148 and ride in the associated slot 128 until it is engaged by the following finger 132. Thus the shaft 116 is rotated intermittently for similarly rotating the film feeding sprocket 114 associated therewith.

Gear 136 is normally arranged in mesh with a clutch pinion 150 rotatably journaled on a lever 152, see Figure 5. Clutch pinion 150 meshes with a gear 154 keyed to a shaft 156 rotatably journaled in the rib 158 extending upwardly from the ledge 160 on the bracket 12. Lever 152 is rotatably mounted on the shaft 156 to be pivoted thereon as an axis. The opposite end of the shaft 156 is keyed to a gear 162 arranged in mesh with an idler gear 164 meshing with a gear 166 keyed to a shaft 168 rotatably journaled in the bracket 12, see Figure 3.

Shaft 168 extends through the bracket 12 and is provided with a pinion 170 at its opposite end, which pinion is fixedly related to a gear 174 arranged in mesh with a pinion 176 fixedly related to a gear 172, which is in mesh with a pinion 180 fixedly related to a large gear 182 in mesh with a pinion 184 driven by the motor 186. Thus the sprocket 114 associated with the unit 28 is driven through the medium of the motor 186 for unwinding the film 76 on the reel 74 of that unit. As the unit 28 moves into projecting position, the film associated with the unit 30 is unwound from the reel 72 onto the reel 74 of that unit. Such unwinding is accomplished through the medium of a gear 188 arranged in mesh with a gear 190 corresponding to the gear 162 of Figures 3 and 5. Gear 190 is operatively connected with a pinion 192 corresponding to the pinion 154 of Figure 5, which pinion is in mesh with the clutch gear 194 meshing with the gear 196 corresponding to the gear 136. It will thus be seen that the unit 30 is operated through the medium of a train of gears similarly to the unit 28. Clutch gear 194 is mounted on a lever 198 in the same manner as the clutch gear 150.

Figure 1 illustrates the film 76 of the unit 30 as being transferred from the reel 72 onto the reel 74. In connection with unit 30, the film 76 passes between a roller 198 carried by a lever 200 pivotally connected at 202 to the housing 62. A short bar 204 is pivotally connected at 206 with the lever 200, see Figure 12. Bar 204 carries a roller 208 which presses the film 76 against the roller 198. Bar 204 is of such length as to bring the roller 208 into partly overlapping relation with the roller 198, and the roller 208 is urged in the direction of the roller 198 by a spring 210 convoluted about the pivot 206 with its end 212 hooked underneath the lever 200 and its end 214 hooked over the bar 204.

Figure 1 illustrates the film 76 associated with the unit 30 as being provided with a stop 216 adjacent the end of the film. The opposite end of the film is provided with a similar stop, as illustrated at 218 in Figure 12. Since all the units 28 to 38 are identical in construction, the description of one will apply to all.

Film 76 also passes between rollers 220 and 222 associated with the reel 74. Rollers 198 and 208 are associated with the reel 72. Roller 222 is mounted on a bar 224 of the same construction and operation as the bar 204. However, the spring 210 associated with the bar 204 urges the bar downwardly when viewed according to Figure 1, while bar 224 is urged upwardly when viewed in the same manner. In Figure 11, I illustrate the film 76 as having its end 226 anchored to the hub 228 of the reel 74 through the medium of a screw 230 which presses a clamp bar 232 against the hub 228. Figure 11 illustrates the inside face of the side wall 234 of the reel 74, while Figure 1 illustrates the opposite side of the wall. The wall is provided with a plurality of slots 236 for the reception of pins 238 connected with levers 240 positioned on the outer face of the wall. Levers 240 are pivotally connected at 242 with the wall 234, and the slots 236 are curved concentrically with the pivotal axes 242. A spring 244 is convoluted at 246 and has its ends fixedly secured to pivots 248 rotatably journaled in two of the levers 240. Each pair of levers 240 is provided with one spring 244 which urges the pin 238 ends outwardly about the pivotal axes 242.

Figure 11 illustrates the pins 238 located in the outer ends of the slots 236. Pins 238 are of such length as to substantially contact the flange 250 of the reel. The film 76 is wound on the pins 238. Figure 11 illustrates the reel 74 unwound and conditioned for winding up the film. Rotation of the reels 72 and 74 causes the film to be wound upon the pins. Reels 72 and 74 in the unit 30 are rotated oppositely to the same reels in the unit 28 when positioned according to Figure 1. Reels 72 and 74 rotate at the same speed. Pins 238 define a drum of variable diameter depending upon the amount of film thereon. As the unwinding action is started, the pins define a drum diameter substantially equal to the diameter of the film wound on the reel 72.

As film is accumulated on the pins 238, the levers 240 will be pivoted inwardly in such degrees as to maintain the diameter of the convoluted film on the drum of the same diameter as the convoluted film on the reel 72. During the unwinding action, pins 238 of the reel 74 will be shifted to closer positions with respect to the axis of the reel, while the same pins of the reel 72 will move outwardly so as to compensate loss of diameter incident to unwinding of the reel. The two reels are identical in construction and operation so that the outside diameters of the wound film remain the same whether winding or unwinding. The speed of the unwinding action is slightly faster than the projection action so as to insure complete unwinding before reaching the end of the film being projected.

As all the film is wound onto the reel 74, the stop bar 218 of Figure 12 will engage the rollers 198 and 208 for pivoting that end of the lever 200 downwardly and elevating the bar 252 to which the lever 200 is pivotally connected, as at 254. The lower end of the lever 252 is pivotally connected at 256 with the lever 258 which carries the roller 220 and the rollered bar 224. Lever 258 is pivotally connected at 260 with the housing 62. On the bracket 14 I provide a stop lug 262 for engagement with the flange 264 fixedly related to one end of the lever 258. Rotation of the projector units in the direction of the arrow 60 of Figure 2 moves the stop flange 264 into engagement with the stop lug 262 in the direction of the arrow 266.

Stop flange 264 is flanged at 268 for the reception of a bolt 270 extending through an opening in the right-angular bend 272 fashioned at the end of the lever 258. Flange 264 engages the stop lug 262 to arrest rotary movement of the units 28 to 38 immediately upon proper positioning of the projector unit for projecting purposes. Flange 264 is latched in position so as to restrain the lever 258 from accidental movement after alignment of one of the units for projecting purposes. Each of the units 28 to 38 is provided with a lever 258.

To the bracket 14 I connect a spring 274 which is provided with convolutions 276 mounted on the pin 278 attached to the lugs 280. The spring includes reaches 282 secured to the bracket 14 by the screw 284. The spring also includes reaches 286 which are angularly positioned to be cammed in the direction of the arrow 288 through engagement with the flange 264. As the flange 264 comes into engagement with the stop lug 262, the ends 290 of the spring 274 snap to the position of Figure 9 for latching the lever 258 in position. Upward movement of the link 252 through engagement of the stop bar 218 with the rollers 198 and 208 moves the lever 258 for elevating the flange 264 out of holding relation with the stop lug 262 so that the units 28 to 38 are freed for rotation immediately upon finishing the film being projected.

In Figure 1, the link 252 associated with the unit 30 is pivotally connected at 292 with a lever 294 pivotally connected at 296 with the housing 62. Lever 294 includes an end 298 which, in the position of Figure 1, actuates the clutch pinion 194 for moving it out of engagement with the pinion 196 which corresponds to the pinion 162. Thus the clutch pinion 194 is thrown out of mesh with the gear 196 as soon as the film 76 has been wound upon the reel 74. At the same time, the stop flange 264 is moved out of abutting relation with the stop lug 262.

Figure 1 illustrates the end 298 of the lever 294 associated with the unit 30 as being arranged in engagement with a lever 300 which holds the clutch pinion 194 in mesh with the gear 196, while the end 298 of the lever 294 associated with the unit 28 is arranged in abutting relation with a similar lever 302 for holding the pinion 150 in mesh with the gear 136. Figures 4 and 6 illustrate the lever 302 and its associated mechanism. The lever 302 is in the nature of a bell crank having its short reach 304 pivotally connected at 306 with the ledge 160. A link 308 is pivotally connected at 310 with the ledge 160. Intermediate the ends of the link 308 I provide a slot 312 for the reception of a pin 314 fixedly related to the lever 302. The opposite end of the link 308 is provided with a slot 316 for the reception of a pin 318 fixedly related to a bar 320 slidably mounted on one face of the bracket 12 substantially flush with the ledge 160. The bar 320 is provided with a longitudinal slot 322 for the reception of headed pins 324 which slidably connect the bar with the bracket 12.

In the lower end of the lever 152 I provide a slot 326 for the reception of a pin 328 fixedly related to the bar 320. Lever 302 is urged to its normal position of Figure 4 by reason of a tension spring 330 having one end connected with the bar and its opposite end anchored to the ledge 160. With the lever 302 positioned according to Figure 4, the lever 152 takes the position of Figure 5 for holding the pinion 150 out of mesh with the gear 136. The pinion 150 is moved into mesh with the gear 160 through engagement of the end 298 with the lever 302. Such engagement shifts the lever 302 from the full line to the dotted line position of Figure 4. As the unit 28 is moved into projecting position, the end 298 engages the lever 302 and pivots the lever to the dotted line position which brings the pinion 150 into driving relation with the gear 136 for moving the film. End 298 will remain in pressure relation with the lever 302 and hold the lever in the dotted line position until the film on the reel 74 of the unit 28 is completely unwound.

As the film in the unit 28 approaches its end, the stop bar 216 will engage the rollers 220 and 224 associated with the lever 258 (illustrated in connection with the unit 30 of Figure 1) and lift the link 252 of the unit 28 upwardly for moving the end 298 downwardly out of holding relation with the lever 302.

The position of the lever 302 determines the operation of the motor 58 which rotates the units 28 to 38. In Figure 4, the bracket 12 includes a lug 332 to which I connect a bar 334 of insulating material. One end of the bar 334 is connected with the lug 332 through the medium of a terminal screw 336 to which the wire 338 is electrically connected and leads to the motor 58. Lug 332 carries a spring contact 340 provided with a contact point 342 arranged to have conducting relation with a point 344 carried by the opposite end of the bar 334. Point 344 is electrically connected with a terminal screw 346 to which I connect the second wire 348 which leads to the motor 58. Thus the circuit through the motor 58 will be closed so long as the points 342 and 344 are in contact.

Spring contact 340 has its end 350 arranged to be engaged by the upstanding finger 352 carried by the slidable bar 320. It will thus be seen that the switch of the motor 58 remains closed so long as the finger 352 is spaced from the spring contact 340. The motor will continue operating for turning the units 28 to 38 until the end 298 has moved the lever 302 sufficiently far to bring the finger 352 into pressure relation with the spring contact 340 for separating the points 342 and 344. Thus the circuit through the motor 58 will remain broken as long as the end 298 is in pressure relation with the lever 302, and such pressure relation is maintained until the stop bar 216 engages the rollers 220 and 222. Such engagement frees the lever 302 for again closing the circuit through the motor 58 in addition to moving the gear 150 out of mesh with the gear 136.

Referring to Figures 3, 4 and 5, the rib 158 is slotted at 354 for accommodating the lever 302. The face 356 of the bracket 12 is provided with spaced flanges 358 constituting guide for the end 298 of the unit 28 as it is being moved into projecting position. Flanges 358 may be secured to the bracket 12 by screws 360. Figure 4 illustrates the flanges 358 as being spaced from the gear 162 such a distance as to provide ample space 362 for accommodating the end 298 as it is shifted out of holding relation with the lever 302. The flanges are curved for elevating the end 298 into alignment with the lever 302.

Lever 300 together with its associated mechanism is identical with the lever 302 and its associated mechanism with the exception that it is devoid of a switch. Thus the sliding bar 320 associated with the lever 300 is devoid of the finger 352. Referring to Figure 3, it will be noted that the second rib 158 is provided with a slot 364 which is reversed with respect to the slot 354 associated with the lever 302. The guide flanges 366 associated with the slot 364 are also reversed.

I claim:

1. In a motion-picture projector, a movable carrier provided with a plurality of films to be successively brought into projecting position through movement of the carrier, a motor for moving the carrier, a switch for the motor, means associated with the carrier cooperable with said switch for opening the latter in advance of the projection of each film, an operating connection between each projected film and said means for closing the switch, to bring the next film into projecting position, and means controlled by said first means for unwinding projected films.

2. In a motion-picture projector, a movable carrier provided with a plurality of films to be successively brought into projecting position through movement of the carrier, a motor for moving the carrier, a switch for the motor, means associated with the carrier cooperable with said switch for opening the latter in advance of the projection of each film, an operating connection between each projected film and said means for closing the switch, to bring the next film into projecting position, means controlled by said first means for unwinding projected films, and stop means for arresting further movement of the carrier as each film is brought into projecting position.

3. In a motion-picture projector, a movable carrier provided with a plurality of films to be successively brought into projecting position through movement of the carrier, a motor for moving the carrier, a switch for the motor, means associated with the carrier cooperable with said switch for opening the latter in advance of the projection of each film, an operating connection between each projected film and said means for closing the switch, to bring the next film into projecting position, means controlled by said first means for unwinding projected films, stop means for arresting further movement of the carrier as each film is brought into projecting position, and means for rendering said stop means inoperative to permit movement of the carrier after each film is brought into projecting position.

4. In a motion-picture projector, a movable carrier including a plurality of reel units provided with films to be successively brought into projecting position through movement of the carrier, a motor operating continuously during the total projecting time of the plurality of films, a drive connected with the motor for successively actuating the reel units when brought into projecting position, a second motor operatively connected with the carrier for moving the same, a switch for the second motor, means associated with the carrier cooperable with said switch for opening the latter in advance of the projection of each film, an operating connection between each projected film and said means for closing the switch, to bring the next reel unit into projecting position, said drive being operatively related to said means to be disconnected during movement of the carrier for bringing the next reel unit into projecting position, and means actuated by projected films for unwinding the latter.

5. In a motion-picture projector, a movable carrier including a plurality of reel units provided with films to be successively brought into projecting position through movement of the carrier, a motor operating continuously during the total projecting time of the plurality of films, a drive connected with the motor for successively actuating the reel units when brought into projecting position, a second motor operatively connected with the carrier for moving the same, a switch for the second motor, means associated with the carrier cooperable with said switch for opening the latter in advance of the projection of each film, an operating connection between each projected film and said means for closing the switch, to bring the next reel unit into projecting position, said drive being operatively related to said means to be disconnected during movement of the carrier for bringing the next reel unit into projecting position, film unwinding means operatively connected with said drive, and means actuated by unwound films for disconnecting the drive.

6. In a motion-picture projector, a movable carrier including a plurality of reel units provided with films to be successively brought into projecting position through movement of the carrier, a drive unit for each reel unit, a motor operating continuously during the total projecting time of the plurality of films, a main drive including a clutch means connected with the motor for successive connection with the drive units when the reel units are brought into projecting position, a second motor operatively connected with the carrier for moving the same, a switch for the second motor, means associated with the carrier cooperable with said switch for opening the latter in advance of the projection of each film, and an operating connection between each projected film and said means for closing the switch, to bring the next reel unit into projecting position, said clutch means being operatively connected with said means to be disconnected from each drive unit during movement of the carrier for bringing the next reel unit into projecting position.

7. In a motion-picture projector, a rotary carrier including a plurality of reel units provided with films to be successively brought into projecting position through movement of the carrier, a drive unit for each reel unit, a motor operating continuously during the total projecting time of the plurality of films, a main drive including a clutch means connected with the motor for successive connection with the drive units when the reel units are brought into projecting position, a second motor operatively connected with the carrier for moving the same, a switch for the second motor, means associated with the carrier cooperable with said switch for opening the latter in advance of the projection of each film, and an operating connection between each projected film and said means for closing the switch, to bring the next reel unit into projecting position, said clutch means being operatively connected with said means to be disconnected from successive drive units during movement of the carrier for bringing the next reel unit into projecting position.

8. In a motion-picture projector, a rotary carrier including a plurality of reel units provided with films to be successively brought into projecting position through movement of the carrier, a drive unit for each reel unit, a motor operating continuously during the total projecting time of the plurality of films, a main drive including a clutch means connected with the motor for successive connection with the drive units when the reel units are brought into projecting position, a second motor operatively connected with the carrier for moving the same, a switch for the second motor, means associated with the carrier cooperable with said switch for opening the latter in advance of the projection of each film, an operating connection between each projected film and said means for closing the switch, to bring the next reel unit into projecting position, said clutch means being operatively connected with said means to be disconnected from successive drive units during movement of the carrier for bringing the next reel unit into projecting position, a second main drive including a clutch connected with the first motor for successive connection with the drive units in projected positions of the reel units for unwinding projected films, and means actuated by successively unwound films for declutching the second main drive.

9. In a motion-picture projector, a rotary carrier including a plurality of reel units provided with films to be successively brought into projecting position through movement of the carrier, a drive unit for each reel unit, a motor operating continuously during the total projecting time of the plurality of films, a main drive including a clutch means connected with the motor for successive connection with the drive units when the reel units are brought into projecting position, a second motor operatively connected with the carrier for moving the same, a switch for the second motor, means associated with the carrier cooperable with said switch for opening the latter in advance of the projection of each film, an operating connection between each projected film and said means for closing the switch, to bring the next reel unit into projecting position, said clutch means being operatively connected with said means to be disconnected from successive drive units during movement of the carrier for bringing the next reel unit into projecting position, a second main drive including a clutch connected with the first motor for successive connection with the drive units in projected positions of the reel units for unwinding projected films, means actuated by successively unwound films for declutching the second main drive, each reel unit comprising two reels geared for rotation at the same speed and geared to its respective drive unit, and means associated with each reel in each reel unit for maintaining the wound film on the two reels of each reel unit at the same diameters.

10. In a motion-picture projector, a rotary carrier including a plurality of reel units provided with films to be successively brought into projecting position through movement of the carrier, a drive unit for each reel unit, a motor operating continuously during the total projecting time of the plurality of films, a main drive including a clutch means connected with the motor for successive connection with the drive units when the reel units are brought into projecting position, a second motor operatively connected with the carrier for moving the same, a switch for the second motor, means associated with the carrier cooperable with said switch for opening the latter in advance of the projection of each film, an operating connection between each projected film and said means for closing the switch, to bring the next reel unit into projecting position, said clutch means being operatively connected with said means to be disconnected from successive drive units during movement of the carrier for bringing the next reel unit into projecting position, a second main drive including a clutch connected with the first motor for successive connection with the drive units in projected positions of the reel units for unwinding projected films, means actuated by successively unwound films for declutching the second main drive, each reel unit comprising two reels geared for rotation at the same speed and geared to its respective drive unit, means associated with each reel in each reel unit for maintaining the wound film on the two reels of each reel unit at the same diameters, and means for arresting further rotation of the carrier as each reel unit is brought into projecting position, said last means being rendered inoperative by said second means after unwinding projected films for permitting further rotation of the carrier.

11. In a motion-picture projector, a rotary carrier including a plurality of reel units provided with films to be successively brought into projecting position through movement of the carrier, a drive unit for each reel unit, a motor operating continuously during the total projecting time of the plurality of films, a main drive including a clutch means connected with the motor for successive connection with the drive units when the reel units are brought into projecting position, a second motor operatively connected with the carrier for moving the same, a switch for the second motor, means associated with the carrier cooperable with said switch for opening the latter in advance of the projection of each film, an operating connection between each projected film and said means for closing the switch, to bring the next reel unit into projecting position, said clutch means being operatively connected with said means to be disconnected from successive drive units during movement of the carrier for bringing the next reel unit into projecting position, a second main drive including a clutch connected with the first motor for successive connection with the drive units in projected positions of the reel units for unwinding projected films, means actuated by successively unwound films for declutching the second main drive, each reel unit comprising two reels geared for rotation at the same speed and geared to its respective drive unit, means associated with each reel in each reel unit for maintaining the wound film on the two reels of each reel unit at the same diameters, means for arresting further rotation of the carrier as each reel unit is brought into projecting position, said last means being rendered inoperative by said second means after unwinding projected films for permitting further rotation of the carrier, a shutter for each reel unit, and an intermittent-movement device connected with each shutter and each drive unit.

VERNON A. ROLLINGS.